March 28, 1961 R. C. MOTT 2,976,877
PNEUMATIC CONTROL DEVICE HAVING RANGE ADJUSTMENT
Filed May 25, 1959 3 Sheets-Sheet 1

INVENTOR.
RICHARD C. MOTT
BY
Joseph E Ryan
ATTORNEY

March 28, 1961  R. C. MOTT  2,976,877
PNEUMATIC CONTROL DEVICE HAVING RANGE ADJUSTMENT
Filed May 25, 1959  3 Sheets-Sheet 3

INVENTOR.
RICHARD C. MOTT
BY
*Joseph E. Ryan*
ATTORNEY

United States Patent Office 2,976,877
Patented Mar. 28, 1961

2,976,877

PNEUMATIC CONTROL DEVICE HAVING RANGE ADJUSTMENT

Richard C. Mott, Harwood Heights, Ill., assignor to Minneapolis-Honeywell Regulator Company, Minneapolis, Minn., a corporation of Delaware Filed May 25, 1959, Ser. No. 815,620

7 Claims. (Cl. 137—85)

This invention relates to pneumatic control devices and in particular to an improved pneumatic control device having a range adjustment.

Figure 1:
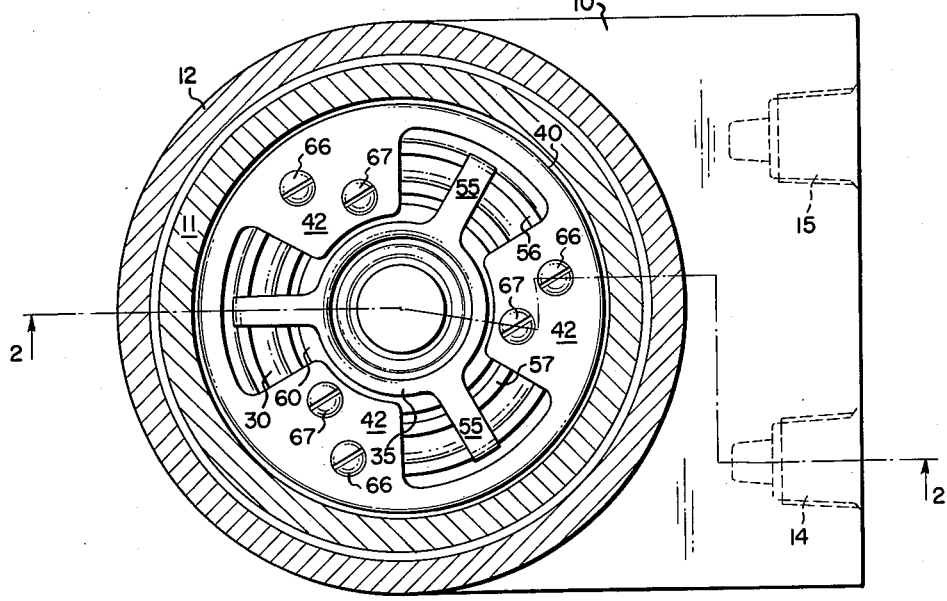
Figure 2:
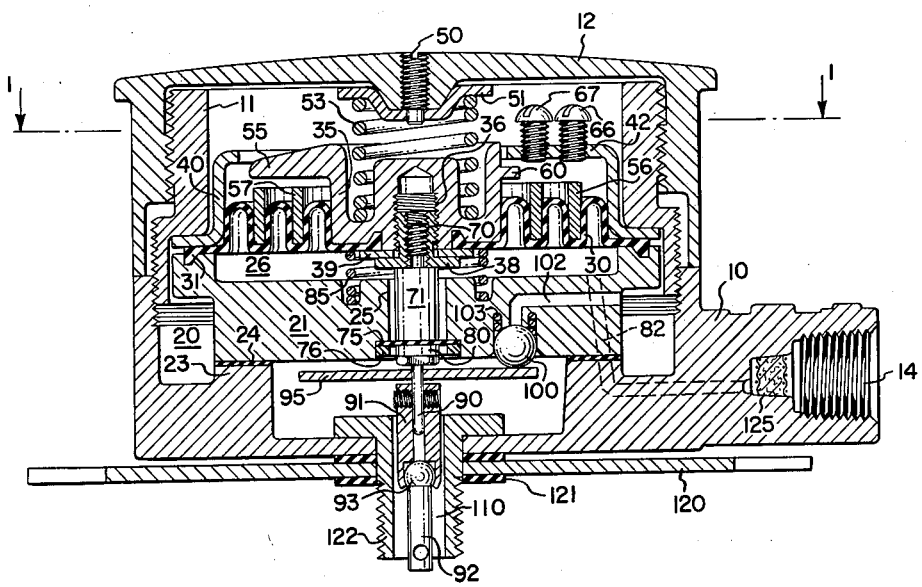
Figure 5:
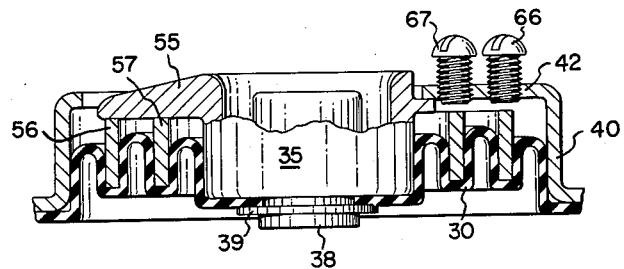
Figure 6:
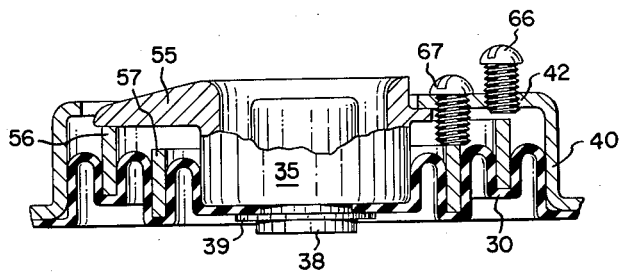
Figure 7:
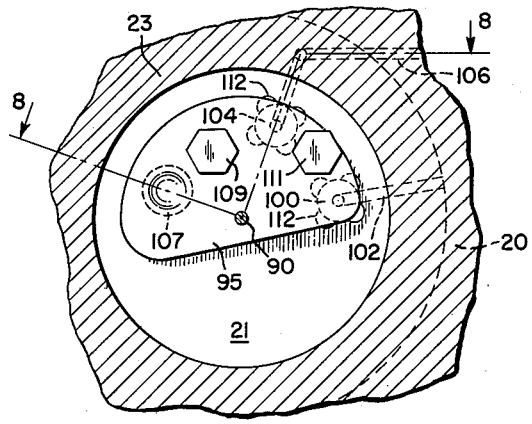
Figure 8:
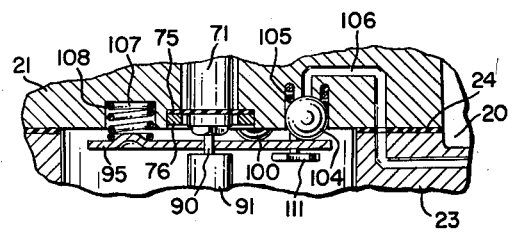
Figure 9:
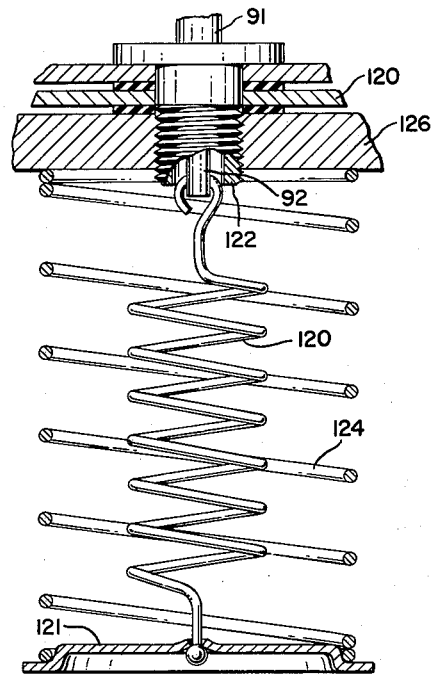

Apparatus of this type is shown in the copending application of Ricard V. Vana entitled "Pneumatic Control Device," Serial No. 690,717, filed October 17, 1957, now Patent 2,937,655, issued May 24, 1960, which discloses a pneumatic control device or relay having range adjustment and over which this application is an improvement. In that application, range adjustment of a pneumatic control device is effected by change in the effective area of the pilot diaphragm through a clamping means associated therewith. In the present invention the same type of range adjustment is utilized in a pneumatic control device but an improvement in diaphragm shape and clamping means permits a simplification of over-all design and a greater range of adjustment. The object of this invention is to provide a simplified range adjustment in a pneumatic control device with a considerably greater range of adjustment and ease in adjustment. It also provides a structure which is easy to maintain and economical to manufacture. These and other objects of the invention will become apparent from a reading of the attached description together with the drawings wherein:

Figure 1 is a plan view of a portion of the pneumatic regulating device with a cover removed, Figure 2 is a side elevation view in irregular section taken along the lines 2—2 in Figure 1 to show the relationship of parts, Figures 3, 4, 5, and 6 are elevation views of a portion of the pneumatic control device showing the range adjustment mechanism in various stages or ranges of adjustment, Figure 7 is a bottom view of a portion of the pneumatic control device disclosing a pneumatic relay, Figure 8 is a sectional view of the portion of the apparatus shown in Figure 7 along the lines 8—8, and Figure 9 is a sectional view of a follower spring incorporated in the pneumatic control device.

The pneumatic regulating or control apparatus shown herein in the drawings is basically the same as that shown in the above identified copending application of Richard V. Vana. A multi-part housing or casing structure including a base 10, an intermediate securing ring 11 and a cup portion 12 make up an enclosing casing for the control device in which the base section 10 has a plurality of inlets 14 and 15 representing the inlet supply and pilot pressure ports for the device. Base structure 10 has a general recess 20 therein in which is positioned a relay housing block 21 which rests on an annular ridge portion 23 of the base in recess 20 and has a suitable sealing means or gasket 24 positioned therebetween. The relay block has a central aperture 25 therethrough and its upper surface is recessed as at 26 to define part of a pilot chamber to be later described. Positioned above the relay block 21 is an annular convoluted diaphragm 30 having a lip or bead portion 31 at the outer periphery which sets into a notched recess in the relay block for sealing purposes. A similar lip or beaded inner periphery is included in the diaphragm which is positioned in a connecting member 35. Member 35 has a centrally located threaded recess 36 therein in which is positioned a screw member 38 having a washer or positioning means 39 positioned above the same to hold the inner bead of the diaphragm in place on member 35 sealing the same and defining the pilot chamber 26. The outer periphery of the diaphragm 30 is held in position on the relay block 21 by means of an annular retainer member 40 whose outer periphery overlies the outer periphery of the diaphragm and which includes a plurality of inwardly projecting flanges 42 for purposes of which will be later noted. The annular member 40 is held in position against the block 21 by means of the cylindrical support member 11 which is threaded at its outer periphery into the casing part 10 and mounts also on its outer periphery the cover member 12. Cover member 12 has a centrally located aperture therein in which an adjusting screw 50 is positioned, the screw mounting at its extremity a spring retainer 51 within the confines of the casing which holds the end of the start spring 53 for the device whose opposite extremity is positioned in a recess in the connecting member 35. The connecting member 35 also has a plurality of fingers or flanges 55 which are positioned above a plurality of rings 56, 57 resting in the convolutions of the diaphragm which operate as ultimate limit stops for the rings as they move upward in a manner to be later described. Connecting member 35 also has an annular flange section 60 adapted to engage the projections or flanges 42 on the support member 40 as will be seen in Figure 2. Each flange 42 carries a pair of screws 66, 67 which cooperate with the rings 56, 57 respectively and are adjustable within the respective flanges 42 to limit the movement of the respective rings and effect a change in effective area of the diaphragm for the pilot chamber 26 to vary the range adjustment or range of operation of the device. Start adjustment for the control device is obtained by adjusting or turning the cover 12 on the threaded securing ring 11 which urges the spring support 51 and the spring thereon in a direction to either increase or decrease the spring tension on the connecting member 35 and hence the diaphragm 30. The headed screw means 50 merely serves to hold a supporting plate 51 in position.

Screw means 38 which is threaded into a connecting member 35 to secure the diaphragm thereto also has a tapped aperture 70 into which a threaded connecting member 71 is threaded or positioned, the connecting member extending through the aperture 25 in the relay block 21 and communicating with the chamber 26. The connecting member 71 has attached thereto at its lower periphery a gasket 75 which is secured through suitable lock nut means 76 to a recess in the base of the relay block 21 common to the aperture 25, the sealing member or gasket 75 being connected to the connecting member or rod 71 by means of a lock nut and washer indicated at 80. Receiving member 75 seals the chamber at the lower surface thereof and the pilot chamber 26 receives an air supply through a passage indicated in phantom at 82 (Figure 2) leading to the inlet duct or port 15. Also positioned in pilot chamber 26 is a spring member or return spring 85 which rests at one extremity in a spring receiving recess in the upper surface of the block 21 and against a lower surface of the diaphragm 30 to urge the diaphragm upward against the tension spring 53. This spring is included herein for spring balancing purposes and can be omitted if desired. The shaft 71 connected to the connecting member 35 moves with movement of the diaphragm relative to the casing means and base member 21 and a projecting link thereof indicated at 90 has connected thereto a further connection member 91 with a link 92 secured thereto through a suitable universal type linkage or joint 93. Positioned between the connecting member 91 and the member 71 is a plate 95 forming a part of the relay mechanism, the specific details of which are shown in detail in the above identified Vana patent and the F. D. Joesting Patent No. 2,310,293, dated February 9, 1943 and are described briefly below. The relay mechanism, shown in part in Figures 2, 7 and 8, is a three-way valving unit. It includes a pair of ball valve members 100, 104 held in recesses in the relay block 21 which are connected to ports or conduits 102, 106, as will be later identified. The respective ball closure members 100, 104 are urged away from their respective ports 102, 106 or conduits to open the passages through springs 103, 105 respectively. The ball valve members and the respective conduits or ports provide the two valve members making up the three-way valve configuration, one of which is an inlet valve (100, 102) and one of which is an exhaust valve (104, 106). Air flow in the recesses around the ball valve members which seat on the ends of their respective conduits is facilitated by grooves or slots 112 in the recesses such as is shown in phantom in Figure 7. Plate 95 of the relay mechanism has the link 90 projecting through it and is positioned between the nut and washer assembly 80 and the connecting member 91. The spacing between the nut and member 90, which is shown exaggerated in Figures 2 and 8, is such that the plate will be engaged and tilted, as will be later seen, with slight upward or downward movement of the member 90 from a reference position in which both valve members are closed. As will be seen in Figures 2, 7, and 8, the plate rests against and holds the ball members 100, 104 in their respective recesses in block 21. A spring 107, positioned in a recess 108 in block 21, also bears against plate 95 and stop or guide pins 109, 111 threaded into block 21 position the plate laterally with respect to the ball valve members (see Figure 7). The spring 107 and pins 109, 111 urge the plate 95 against the ball members and the plate pivots or tilts with upward or downward movement of the pin 90 about axes extending between the spring and the respective ball valve members 100, 104. Thus, upon tilt of the plate 95 with upward or downward movement of the linkages 71, 90 and 91 through diaphragm movement one or the other of the valving members will become unseated to open the respective passage while the plate tilts on the other. As indicated in Figure 2, the passage 102 leads to the chamber 20 which is vented to atmosphere through means or a conduit (not shown). Similarly the second valving member 104 is connected from the supply port 14 through a conduit shown at 106, in Figure 8, to the valving member 104 from which air enters the chamber formed below the relay block 21 and defined by the gaskets 24 and sealing member 75 to be exhausted through an aperture indicated at 110 in the base member 10 (see Figure 2). This is the output port of the valving arrangement and supply air is modulated or controlled by movement of the plate 95 to pass through the passage 110 and to the device to be operated thereby. Air from the operating chamber of the device to be operated is exhausted through the valve formed by the valve member 100 and conduit 102 to atmosphere with the opening of the valve and the closure of the valve formed by the ball valve member 104 and conduit 106. A supporting plate 120 is shown connected through seal means 121 to the base member 10. The aperture 110 is actually defined by sleeve member 122 having a threaded outer periphery by means of which this control device is connected to the device to be operated and through which the outlet air is supplied to such a device (not shown). Connected to the link 92 in passage 100 of sleeve 122 and normally positioned in the operating chamber of the device to be operated or controlled (not shown) is a follower spring 120. Spring 120 has a plate 121 connected to its opposite extremity which is adapted to ride against or with the movable element (not shown) of the device to which control air is supplied by the pneumatic relay. A second spring 124 is positioned between the plate 121 and a wall 126 of the device to urge the plate against the movable element. Thus the follower spring will have its extremity positioned with movement of the device to be controlled and will apply a variable bias on the pilot diaphragm 30 in a conventional follow-up manner to act against the signal or branch pressure supplied to the chamber 26. The air supplied both to the pilot port 14 and to the branch or signal port 15 is filtered through filters such as is indicated at 125 in Figure 2 at the entrance of ports 14, 15.

Figures 3, 4, 5, and 6 show various operating conditions for the range adjustment mechanism of the control device. A control apparatus in general operates in the same manner as that disclosed in the copending Vana application in that pilot pressures applied to the pilot chamber will displace the pilot diaphragm and hence the connecting member against the start spring which is also adjustable to determine the pressure at which it starts to move. Movement of the diaphragm and hence the connecting member will move the linkage to tilt the movable member of the valve mechanism to selectively open and close the inlet and exhaust ports leading to the outlet chamber of the device. Start adjustment for the relay mechanism herein is accomplished by displacing the cover relative to a calibrated indicia (not shown), normally included on the base member 10 on the outer periphery thereof to selectively position the end of the start spring 53 and vary the pressure or spring tension applied to the diaphragm. Movement of the plate 95 of the valving mechanism about a pivot point (not shown) will cause one of the ball valve members 100 to be lifted from its seat while the other is secured thereto. Displacement of the opposite direction will seal the first named ball valve member and open the second to provide the desired valving operation which is conventional. Output air is fed through the passage 110 to the device to be operated (not shown) and the connecting member 92 is adapted to be connected to a follower spring to provide a follow-up action on the diaphragm. Range adjustment is provided simply herein through the use of the annular rings positioned in the dwell portions of the convoluted diaphragm over which are positioned the adjusting screw members 66, 67.

Figure 3:
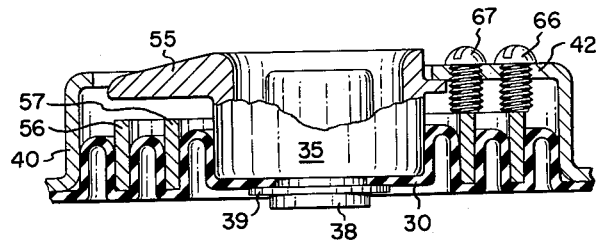
Figure 4:
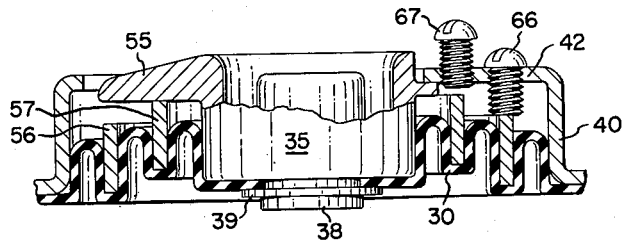

In Figures 3, 4, 5, and 6 are shown respectively the various range adjustments available with this apparatus, Figure 3 showing the highest range, the Figure 4 the second highest range, Figure 5 the lowest range and Figure 6 the third highest range of adjustment. It will be noted in Figure 3 that the screws 66, 67 are adjusted inwardly in the flange sections 42 and the rings 56, 57 are restrained so that most of the diaphragm will not leave its conventional or normal position and only that portion of the diaphragm adjacent the connecting member will be free to move with pressure change in the pilot chamber 26. The effective area of this chamber is determined by the mean diameter of this innermost convolution. The second highest range is shown in Figure 4 where the screws 66 are threaded into the flange section 42 to restrain the respective ring 56 while the screws 67 are withdrawn permitting the two innermost convolutions to be free to move and allowing the ring 57 to ride against the stop members 55 in the uppermost position to apply a force to the connecting member and hence the associated linkage. Similarly in Figure 5, both screw means are withdrawn and the rings 56, 57 are free to move with movement of the diaphragm to provide the lowest pressure range adjustment for the device. Figure 6 shows the second intermediate range somewhat lower than that of Figure 4 and in which the screw 67 is advanced to restrain the movement of the ring 57 so that the diaphragm will move at the outer two convolutions as well as inner convolution adjacent the connecting member. It will be noted that in the uppermost position the outer ring 56 will ride against the stop 55. Ultimate movement of the connecting member is fixed by engagement of the stop portion 60 with the flange sections 42 as shown in the sketches.

This shape and arrangement of parts provides a simplified adjustment mechanism which does not require removal of any parts, any accurate machining and positively limits the displacement of the diaphragm with adjustment of the screws. It further provides a wider variation of range of adjustment with an apparatus which is economical to manufacture and maintain. In considering this invention it should be remembered that the present disclosure is intended to be illustrative only and the scope of the invention should be determined only by the appended claims.

I claim:

1. A pneumatic relay comprising a casing having a recess therein, an annular convoluted diaphragm positioned in said recess and attached at its outer periphery to said casing to define a pilot chamber therein which is variable in volume, inlet means extending through said casing to said chamber to provide a passage for control air pressure thereto, means connected to the inner periphery of said convoluted diaphragm to seal said chamber, valve means mounted on said casing remote from said chamber and having movable means to sequentially open and close a pair of valving members connected to supply, outlet and exhaust passages positioned in said casing, means connecting said means on said diaphragm to said movable valve means to operate said valve means with movement of said diaphragm, a plurality of concentric rings positioned in said convolutions of said diaphragm, flange means connected to said casing above said diaphragm, adjustment means positioned on said flange means and overlying said plurality of rings being adapted to be positioned against said rings to restrain movement of portions of said diaphragms wherein said rings are positioned, and biasing means bearing against a portion of said casing and resting against a diaphragm means to urge said diaphragm towards said pilot chamber.

2. A pneumatic relay comprising a casing having a recess therein, a convoluted diaphragm positioned in said recess and attached at its outer periphery to said casing to define a chamber therein variable in volume, inlet means extending through said casing to said chamber to provide a passage for control air pressure thereto, operating means attached to said diaphragm at the inner periphery thereof and forming a seal therebetween having a flange portion extending through said chamber, valve means mounted on said casing remote from said chamber and having movable means to sequentially open and close a pair of valving members connected to supply, outlet and exhaust passages in said casing, means connecting said operating means of said diaphragm to said movable valve means and including means for sealing said chamber remote from said diaphragm, said connecting means being operable to move with movement of said diaphragm to operate said movable valve means, a plurality of concentric rings positioned in the convolutions of said diaphragm, flange means connected to said casing above said diaphragm, and adjustable screw means positioned in said flange means overlying said concentric rings and adapted to be threaded through said flange means toward and away from said rings; said screw means when engaging said rings preventing movement of portions of said diaphragm from a normal position, and biasing means bearing against a portion of said casing and resting against said operating means of said diaphragm to urge said diaphragm towards said chamber.

3. A pneumatic relay comprising a casing having a recess therein, a convoluted diaphragm positioned in said recess and attached at its outer periphery to said casing to define a chamber therein variable in volume, inlet means extending through said casing to said chamber to provide a passage for control air pressure thereto, operating means attached to said diaphragm at the inner periphery thereof and forming a seal therebetween having a flange portion extending through said chamber, valve means mounted on said casing remote from said chamber and having movable means to sequentially open and close a pair of valving members connected to supply, outlet and exhaust passages in said casing, means connecting said operating means of said diaphragm to said movable valve means and including means for sealing said chamber remote from said diaphragm, said connecting means being operable to move with movement of said diaphragm to operate said movable valve means, a plurality of concentric rings positioned in the convolutions of said diaphragm, flange means connected to said casing above said diaphragm, and adjustable screw means positioned in said flange means overlying said concentric rings and adapted to be threaded through said flange means toward and away from said rings, said screw means when engaging said rings preventing movement of portions of said diaphragm from a normal position, stop means included in said operating means of said diaphragm and overlying said plurality of rings to define a fixed position of movement of said diaphragm independent of said screw means, and biasing means bearing against a portion of said casing and resting against said operating means of said diaphragm to urge said diaphragm towards said chamber.

4. A pneumatic relay comprising a casing having a recess therein, a convoluted diaphragm positioned in said recess and attached at its outer periphery to said casing to define a chamber therein variable in volume, inlet means extending through said casing to said chamber to provide a passage for control air pressure thereto, operating means attached to said diaphragm at the inner periphery thereof and forming a seal therebetween having a flange portion extending through said chamber, valve means mounted on said casing remote from said chamber and having movable means to sequentially open and close a pair of valving members connected to supply, outlet and exhaust passages in said casing, means connecting said operating means of said diaphragm to said movable valve means and including means for sealing said chamber remote from said diaphragm, said connecting means being operable to move with movement of said diaphragm to operate said movable valve means, a plurality of concentric rings positioned in the convolutions of said diaphragm, flange means connected to said casing above said diaphragm, and adjustable screw means positioned in said flange means overlying said concentric rings and adapted to be threaded through said flange means toward and away from said rings, said screw means when engaging said rings preventing movement of portions of said diaphragm from a normal position, stop means included in said connecting means of said diaphragm and overlying said plurality of rings to define a fixed position of movement of said diaphragm independent of said screw means, cover means threaded to said casing and adapted to be adjustably positioned thereon, and spring means positioned between said cover means and said operating means and urging said diaphragm towards said variable chamber being adapted to be varied through adjustment of said cover.

5. A pneumatic relay comprising, a casing means having a recess therein, convoluted diaphragm means positioned over said recess and attached at its outer periphery thereto to define a pilot chamber variable in volume, inlet means extending through said casing means to said chamber to provide a passage for control air pressure thereto, means connected to the inner periphery of said diaphragm means to seal said chamber, valve means included in said casing means and having a pair of valving members controlling inlet, outlet and exhaust passages, conduit means connecting said passages in said casing means to supply, exhaust and outlet ports, said valve means including a movable member for selectively operating said valving members, means connecting said movable member on said valve means to said means on said diaphragm, sealing means included in said connection means to seal said chamber, range adjustment means for said relay including adjustable stop means positioned in part on said convoluted diaphragm and in part on said casing means and adapted to selectively restrict movement of portions of said diaphragm to affect range adjustment thereof, and start adjustment means including an adjustable spring means connected between said casing and said diaphragm and being adjustable to vary the spring tension on said diaphragm to affect start adjustment of said relay.

6. A pneumatic relay comprising, a casing means having a recess therein, convoluted diaphragm means positioned over said recess and attached at its outer periphery thereto to define a pilot chamber variable in volume, inlet means extending through said casing means to said chamber to provide a passage for control air pressure thereto, means connected to the inner periphery of said diaphragm means to seal said chamber, valve means included in said casing means and having a pair of valving members controlling inlet, outlet and exhaust passages, conduit means connecting said passages in said casing means to supply, exhaust and outlet ports, said valve means including a movable member for selectively operating said valving members, means connecting said movable member on said valve means to said means on said diaphragm, sealing means included in said connection means to seal said chamber, range adjustment means for said relay including adjustable stop means positioned in part on said convoluted diaphragm and in part on said casing means and adapted to selectively restrict movement of portions of said diaphragm to affect range adjustment thereof, start adjustment means including an adjustable spring means connected between said casing and said diaphragm and being adjustable to vary the spring tension on said diaphragm to affect start adjustment of said relay, and means connected in part to said diaphragm connection means for limting movement of said diaphragm independent of said range adjustment means.

7. A pneumatic relay comprising, a casing means having a recess therein, convoluted diaphragm means positioned over said recess and attached at its outer periphery thereto to define a pilot chamber variable in volume, inlet means extending through said casing means to said chamber to provide a passage for control air pressure thereto, means connected to the inner periphery of said diaphragm means to seal said chamber, valve means included in said casing means and having a pair of valving members controlling inlet, outlet and exhaust passages, conduit means connecting said passages in said casing means to supply, exhaust and outlet ports, said valve means including a movable member for selectively operating said valving members, means connecting said movable member on said valve means to said means on said diaphragm, sealing means included in said connection means to seal said chamber, range adjustment means for said relay including adjustable stop means comprising a plurality of rings positioned in the convolutions of said diaphragms and adjustable stop means mounted on said casing means, and start adjustment means including an adjustable spring means connected between said casing and said diaphragm and being adjustable to vary the spring tension on said diaphragm to affect start adjustment of said relay.

References Cited in the file of this patent
UNITED STATES PATENTS

| | | |
|---|---|---|
| 2,194,762 | Maliplant | Mar. 26, 1940 |
| 2,811,138 | Clements | Oct. 29, 1957 |